H. O. BARENZ.
SPEED GOVERNOR.
APPLICATION FILED APR. 9, 1909.
1,017,126.
Patented Feb. 13, 1912.
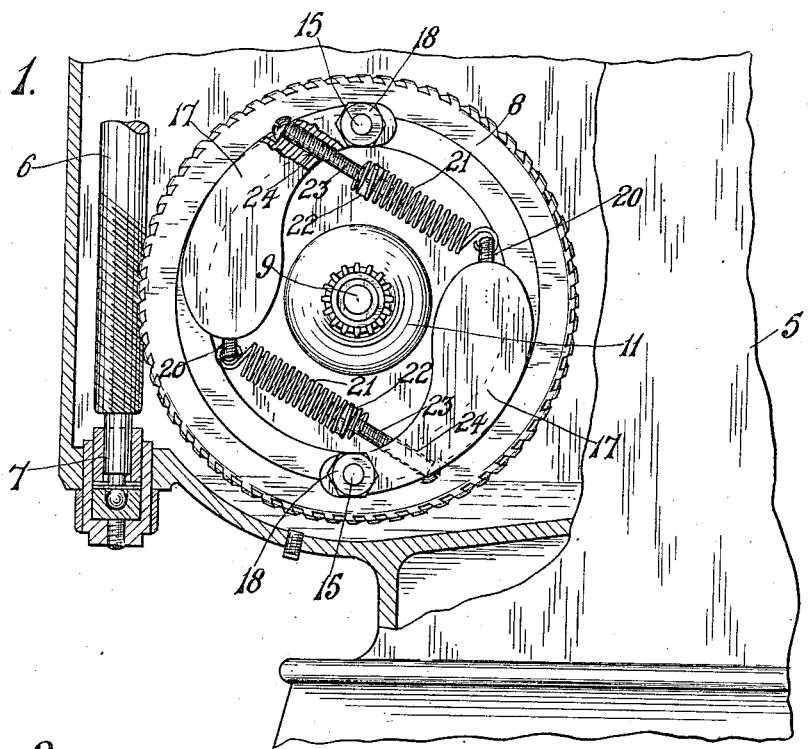
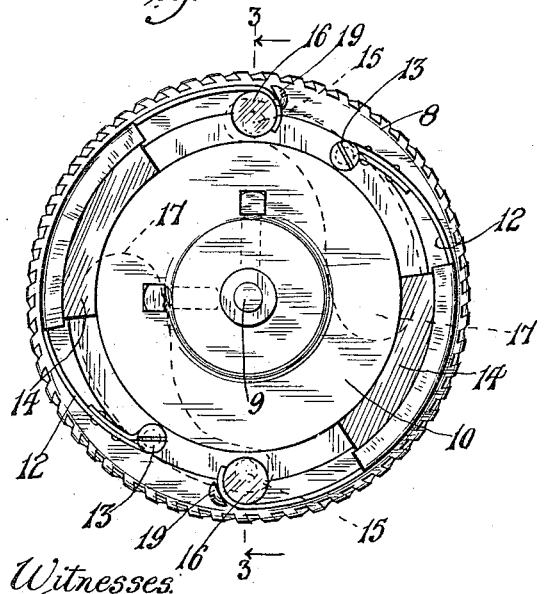
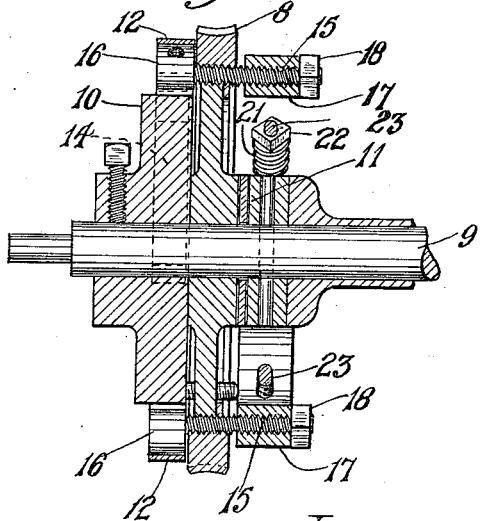
Witnesses
A. J. Andrews.
Anna F. Schmidtbauer
Inventor
Henry O. Barenz
By Benedict, Morsell & Caldwell
Attorneys.

UNITED STATES PATENT OFFICE.

HENRY O. BARENZ, OF JACKSON, WISCONSIN.

SPEED-GOVERNOR.

1,017,126.  Specification of Letters Patent.  Patented Feb. 13, 1912.

Application filed April 9, 1909. Serial No. 488,985.

*To all whom it may concern:*

Be it known that I, HENRY O. BARENZ, residing in Jackson, in the county of Washington and State of Wisconsin, have invented new and useful Improvements in Speed-Governors, of which the following is a description, reference being had to the accompanying drawings, which are a part of this specification.

This invention relates to improvements in speed governors more particularly adapted for use with cream separators, but may be advantageously used in connection with machines which are adapted to drive at predetermined rates of speed.

The principal object of the invention is to provide a speed governor in which a friction drive wheel is adapted to be disconnected from the driven mechanism when the speed of said driven mechanism is increased above a predetermined rate.

A further object of the invention is to provide a speed governor in which portions thereof are capable of adjustment to vary the predetermined rate of speed desired.

A further object of the invention is to provide a speed governor which is simple in construction and inexpensive to manufacture and maintain.

With the above, and other objects in view, the invention consists of the governor and its parts and combinations, and all equivalents thereof.

In the accompanying drawing, in which the same reference characters indicate the same parts in all of the views; Figure 1 is a front side view of the governor shown in connection with the spindle of a cream separator and a fragment of the frame, parts of the frame and a part of the governor being in section; Fig. 2 is a rear side view of the governor; and, Fig. 3 is a vertical sectional view thereof taken on line 3—3 of Fig. 2.

Referring to the drawing the numeral 5 indicates a fragment of a cream separator frame and 6 the spindle thereof having a worm thread provided on its lower end. This spindle is supported in a suitable bearing 7 provided in the frame and is adapted to be rotated at a high rate of speed by means of a worm wheel 8 in mesh with the worm thread. The worm wheel is loosely mounted on a shaft 9 between a friction wheel 10 and a collar 11 both of which are rigidly connected to the shaft.

Friction bands 12 pivoted to the worm wheel by pivot screws 13 and provided with friction shoes 14 are adapted to bear against the periphery of the friction wheel 10 and are the means for transmitting motion from said wheel to the worm or loose wheel 8. Screw bolts 15 provided with eccentric heads 16 are threaded in and extend through the worm wheel and into lever weights 17 on the opposite side of the worm wheel and are rigidly connected to said weights by means of jam nuts 18 which lock the parts together. The ends of the friction bands opposite to their pivotal connection with the worm wheel are connected to the eccentric heads of the screw bolts 15 by means of screws 19 threaded therein. The free ends of the lever weights are provided with eyes 20 to which are connected tension springs 21 and the opposite ends of these springs are fastened to nuts 22 threaded on adjusting screws 23. The screws 23 pass loosely through openings 24 provided in the lever weights and the heads of the screws are adapted to bear against the shoulders formed by the openings on the opposite sides of the lever weights.

The operation of the governor is as follows—assuming that the tension of the spring has been adjusted to prevent the rotation of the spindle from rising above a predetermined rate, the rotation of the shaft and friction wheel will transmit motion to the worm wheel and the spindle by means of the engagement of the friction shoes with the friction wheel and this transmission of motion will continue as long as the speed of rotation does not go above the limit set by the adjusting screws. If however the speed rises above this limit, the lever weights will be swung outwardly by centrifugal force and overcoming the tension of the springs will cause the eccentric headed screw bolts to turn and the eccentric portion of each head to swing toward the friction shoe to which it is connected and move the shoes out of engagement with the friction wheel and stop the transmission of motion and as soon as the rotation of the worm wheel slows down to the desired speed the springs will draw the lever weights inwardly and the friction shoes will again engage the friction wheel as before.

The tension of the springs may be adjusted as desired by turning the adjusting screws with a screw driver without disconnecting any of the parts. The threaded connection of the eccentric headed screw bolts with the worm wheel permits the free turning of said bolts but limits the endwise movement thereof thus forming a novel and very simple means for connecting the parts to the worm wheel.

From the foregoing description it will be seen that a very simple form of governor is provided which is well adapted to accomplish the desired results.

What I claim as my invention is:

A speed governor, comprising a driven shaft having a wheel fast thereon, a wheel loosely mounted on said shaft, friction bands pivotally connected to said loose wheel and provided with friction shoes positioned to engage the fast wheel, bolts extending through the loose wheel and provided with eccentric heads to the peripheries of which the friction bands are connected, lever weights rigidly connected to the bolts for turning said bolts to release the friction shoes from engagement with the fast wheel when the speed of rotation of the loose wheel increases above a predetermined rate, coiled springs connected to the free ends of said lever weights, nuts connected to the opposite ends of said springs, bolts extending through openings provided in said lever weights adjacent to the eccentric headed bolts and threaded to the nuts connected to the springs to adjust the tension of said springs, said springs being connected to both lever weights to provide for equal tension of both lever weights under different adjustments of the springs.

In testimony whereof, I affix my signature, in presence of two witnesses.

HENRY O. BARENZ.

Witnesses:
ALMA H. KLIESE,
GEO. H. FRANK.

---

Copies of this patent may be obtained for five cents each, by addressing the "Commissioner of Patents, Washington, D. C."